United States Patent
Nienberg

[11] 3,971,446
[45] July 27, 1976

[54] AGRICULTURAL DO-ALL MACHINE

[76] Inventor: Raymond Frank Nienberg, Box 44, Glandorf, Ohio 45848

[22] Filed: July 5, 1974

[21] Appl. No.: 486,060

Related U.S. Application Data

[63] Continuation-in-part of Ser. No. 309,156, Nov. 24, 1972, abandoned.

[52] U.S. Cl. .............................. 172/311; 172/456; 172/776
[51] Int. Cl.² .................... A01B 49/00; A01B 63/00
[58] Field of Search ............. 172/456, 311, 60, 245, 172/247, 250, 253, 491, 694, 776

[56] References Cited
UNITED STATES PATENTS

| | | | |
|---|---|---|---|
| 1,742,678 | 1/1930 | Anderson | 172/456 |
| 2,828,597 | 4/1958 | Moore | 172/311 X |
| 3,103,980 | 9/1963 | Bronleewe | 172/456 X |
| 3,177,638 | 4/1965 | Johnson | 172/456 X |
| 3,263,756 | 8/1966 | Hines, Sr. | 172/60 |
| 3,845,517 | 11/1974 | Harris | 172/311 X |

*Primary Examiner*—Stephen C. Pellegrino
*Attorney, Agent, or Firm*—William P. Hickey

[57] ABSTRACT

An agricultural machine for performing multiple farming operations such as planting, fertilizing and harvesting, where desired tilling, so to eliminate the necessity of investment in separate specific machines. The do-all machine, briefly described, consisting of a vehicle having a cab for an operator, an engine that moves the vehicle and also delivers power to a side power outlet to which interchangeable work units such as a sprayer, planter or harvester are attachable and are removably supported from sideward extending carrier arms that are supported from the vehicle.

9 Claims, 12 Drawing Figures

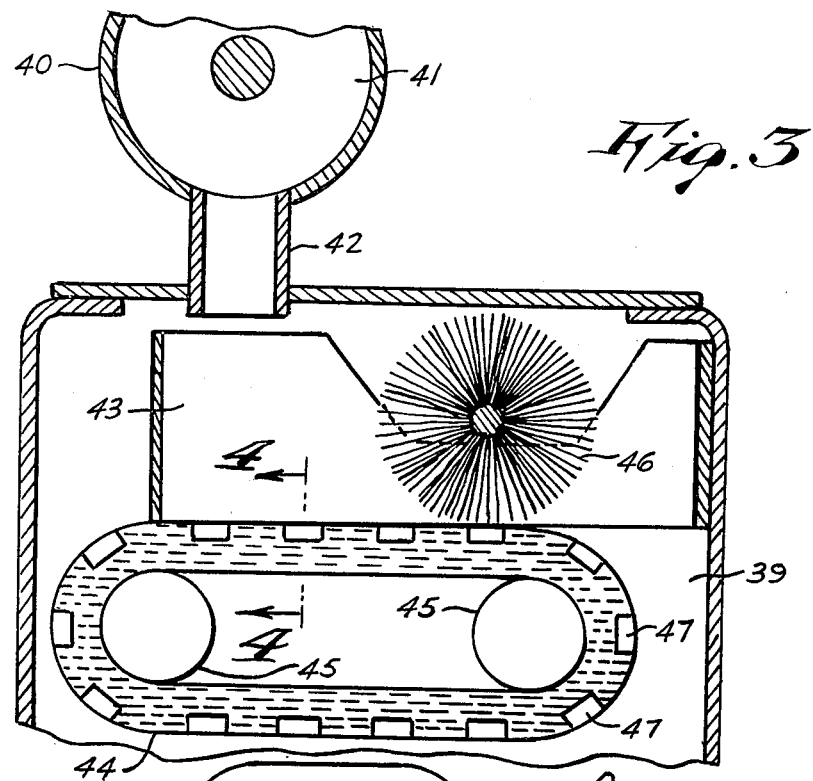
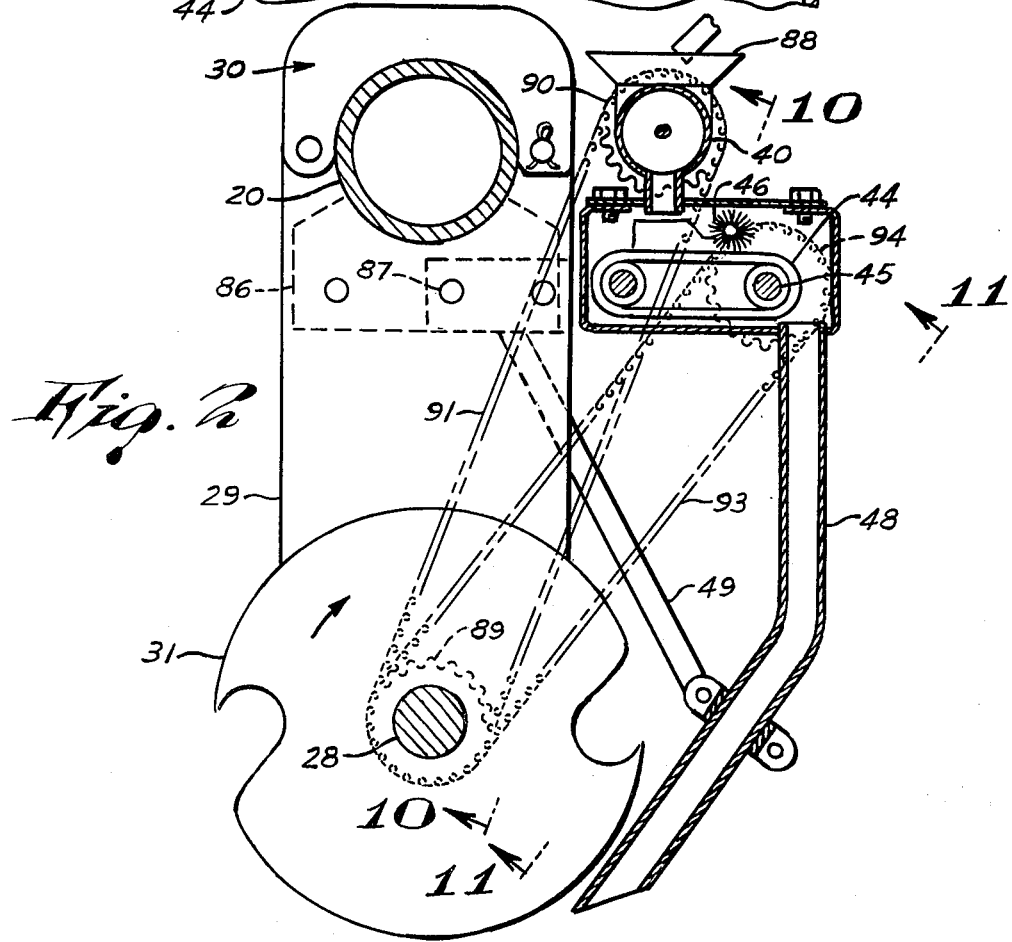

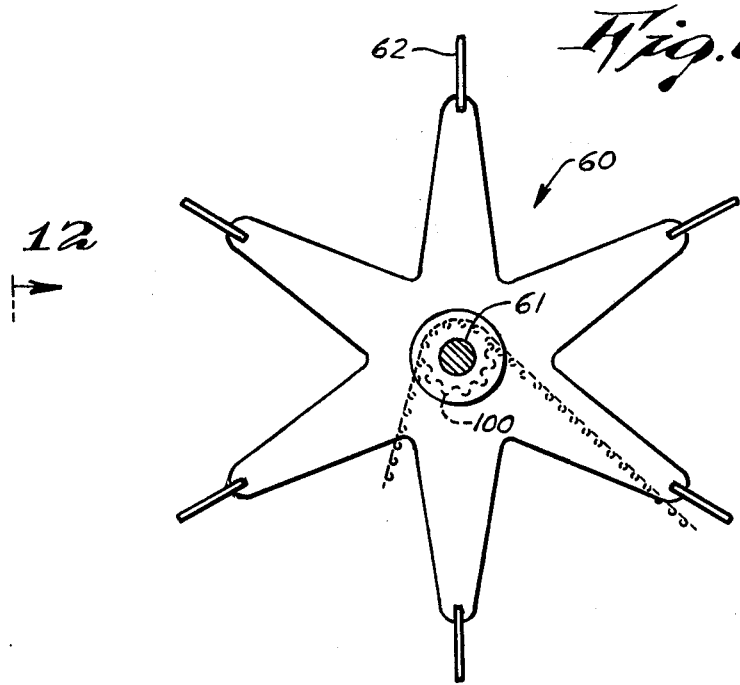
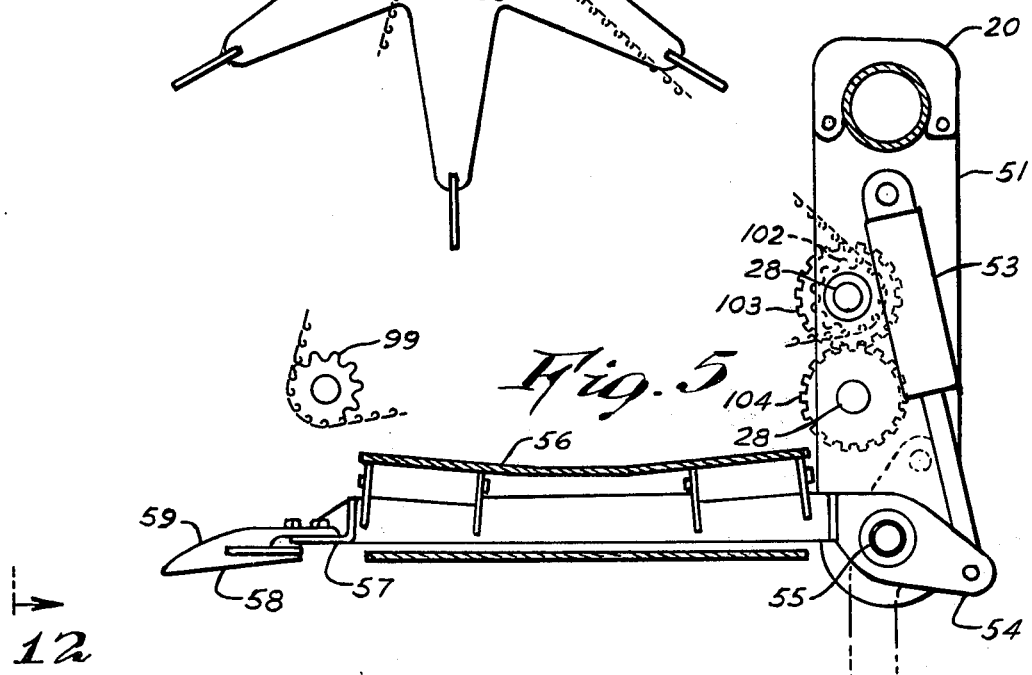
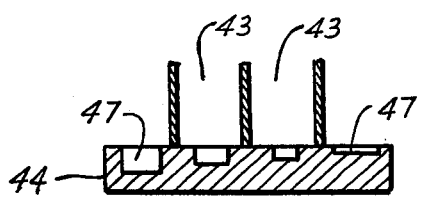

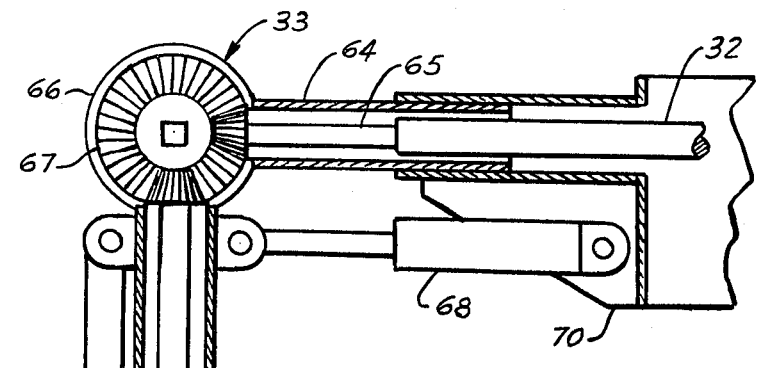
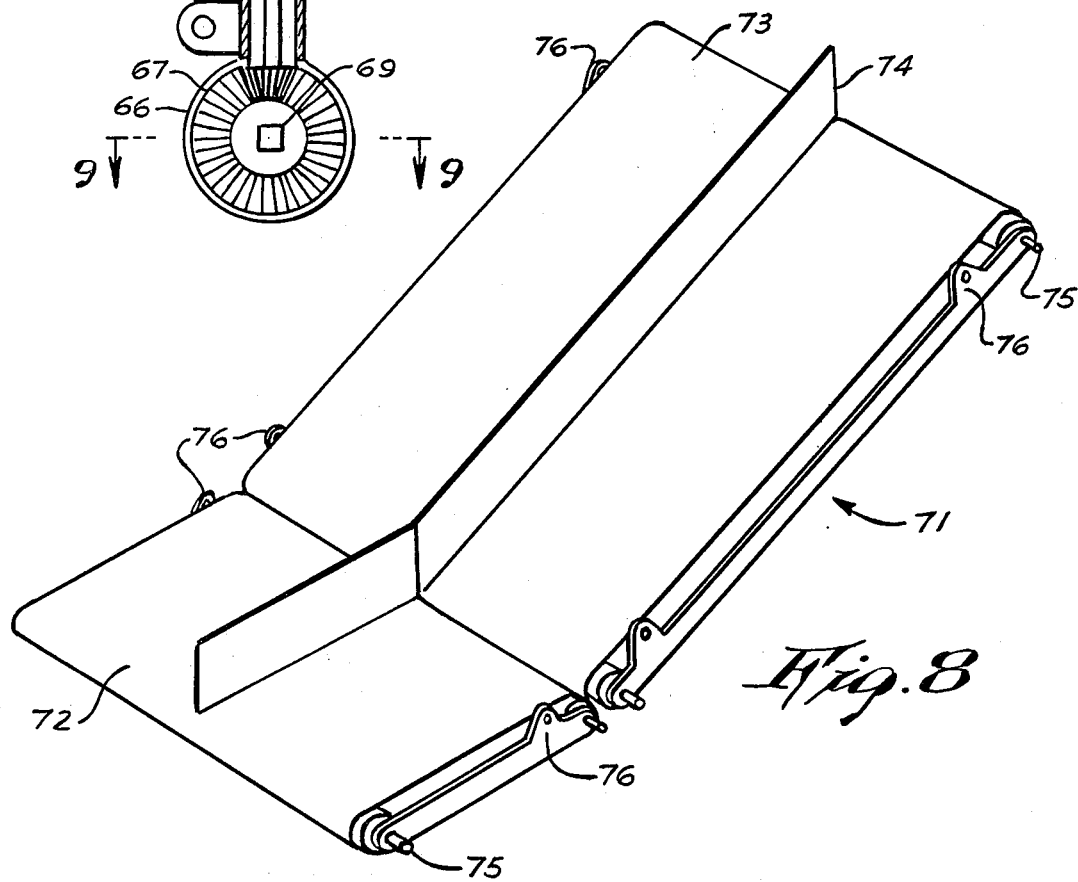

AGRICULTURAL DO-ALL MACHINE

The present application is a continuation-in-part application of copending application Ser. No. 309,156, filed Nov. 24, 1972, now abandoned.

BACKGROUND OF THE INVENTION

In the early days of the Industrial Revolution when heat engines were first invented they were adapted for agricultural purposes by using them to drive winches at fixed locations to pull cables across the field. Various implements, of course, were attached to the cables. The next change which was suggested, was to house the engines on large bridge structures which could either be pulled across the ground, or be driven from stationary engines mounted thereon. With this arrangement, fixed shafting on the bridge structure could be used to operate vertical shafts to which agricultural tools were attached. Such a disclosure is shown, for example, in the early U.S. Romaine Pat. No. 292,511. Obviously, such a structure was cumbersome and unworkable, and the art then moved in the direction of self-propelled traction units called "tractors."

The bulk of the commercially successful prior art agricultural machinery is based on being driven by a propelling vehicle called a "tractor" which supplies the motive force for various draw-behind attachments, each of which performs a separate and distinct agricultural chore, such as tilling, planting, fertilizing, harvesting, etc. In many instances the draw-behind implements are supported on wheels, and the turning of these wheels is used to drive power shafts for the mechanical motion that is necessary on the implement. In other instances the mechanical implement structures are driven from power take offs on the rear of the tractors. In more recent developments, self-propelled implements have been developing wherein a motor is provided on the individual implement to not only make the implement self-propelling, but to drive the mechanical machinery that is a part of the implement. This development took place first in combines for harvesting and thrashing grain, and later was utilized in other harvesting machines for harvesting alfalfa, tomatoes, pickels, etc.

In still another development, the wheels were taken off of the various specialized agricultural implements and the implements were supported from the tractor by means of a three-point hitch to permit greater maneuverability and a shorter turning radius. In general, however, those implements which have been best adapted to the three-point hitch arrangement have been implements of a design which did not contain power driven machinery, but were dragged across the surface of the ground to cultivate the same.

With this background in mind, it is a principal object of the present invention to provide a single do-all machine that does the work of several individual machines, such as a tiller, planter, fertilizer and lime spreader, sprayer and harvester, thus reducing the investment and depreciation involved in separate machines. Whereas the individual machines are used only for a short period each year and remain idle for the rest of the year during which they are depreciating, the present do-all machine can be utilized throughout the year.

Another object is to provide a do-all machine with numerous advantages such as lowering crop production costs, speed up agricultural operations, use minimum tillage, and other many advantages.

Other objects are to provide a do-all machine which is simple in design, inexpensive to manufacture, rugged in construction, easy to use, and efficient in operation.

BRIEF DESCRIPTION OF THE DRAWINGS

These and other objects will be readily evident from a study of the following specification and the accompanying drawings wherein:

FIG. 2 is a fragmentary sectional view through a planting implement that is quickly attached and detached from the side arms of the do-all machine;

FIG. 3 is an enlarged fragmentary view of a portion of the structure shown in FIG. 2;

FIG. 4 is a fragmentary sectional view taken approximately on the line 4—4 of FIG. 3;

FIG. 5 is a fragmentary sectional view through a harvesting attachment which can quickly be attached and detached to the side arms of the machine, and which is intended to be used for harvesting grains, grasses, etc.;

FIG. 6 is a fragmentary sectional view through a reel structure that is normally used in connection with sickle bar harvesters of the type shown in FIG. 5;

FIG. 7 is a fragmentary cross sectional view taken approximately on the line 7—7 of FIG. 1 and showing an articulated drive structure which is used to drive the rotary elements of the various implements which are attached to the side arms of the do-all machine;

FIG. 8 is a fragmentary view of the underbelly conveyor structure of the machine shown in FIG. 1;

DESCRIPTION OF THE PREFERRED EMBODIMENTS

Figure 1:
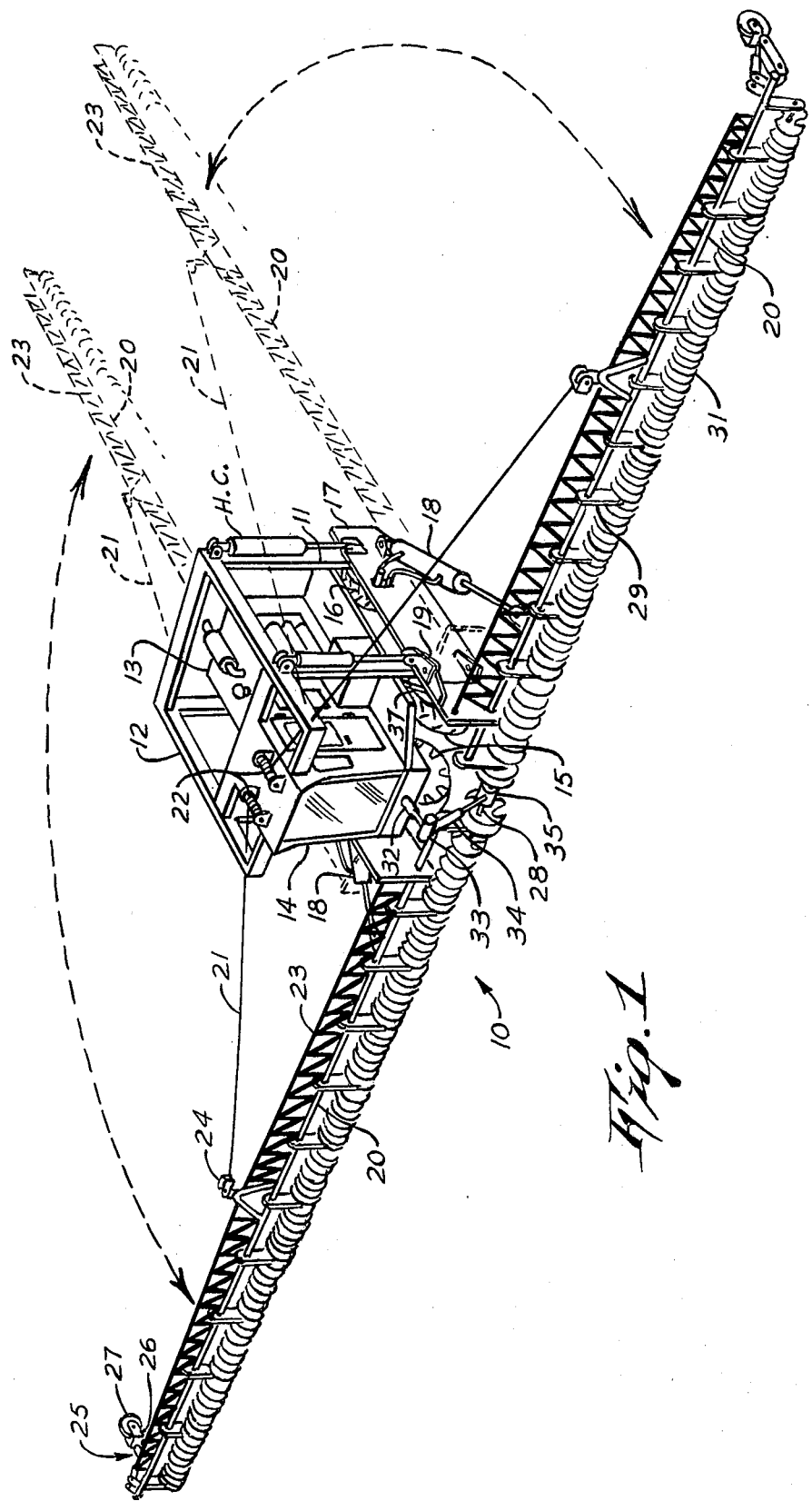
FIG. 1 is a perspective view of a do-all agricultural machine having swingable side booms from which various implements are quickly connected and disconnected, and in which a quick disconnect field cultivator is shown attached.

Referring now to the drawings in detail, FIG. 1 shows a do-all vehicle 10 that includes a power unit frame 11 and an overhead air frame 12. The power unit frame 11 supports an engine 13 and a cab 14 for an operator. The power unit frame 11 is carried upon front drive wheels 15 and rear steering wheels 16. A carrier arm frame 17 extends around each side of the power unit frame. A pair of hydraulic cylinders H.C. support the carrier arm frame 17 from the over-head air frame 12. Hinges 19 connect permanent carrier arms 20 to the carrier arm frame 17, and a respective one of a pair of hydraulic cylinders 18 is positioned between a respective side of the carrier arm frame 17 and a respective one of the permanent carrier arms 20 to swing the arms between working and traveling positions. Additionally, each arm is supported by a respective one of a pair of cables 21 operated by a respective one of a pair of winches 22 which are mounted on the top of the air frame 12. The structure of each permanent carrier arm 20 is strengthened by bridging 23 to which an end of a respective cable 21 is attached by a clamp 24. A respective one of a pair of hydraulic cylinders 25 is mounted on the outer end of each arm 20 and is used to raise and lower a respective one of a pair of dolly wheel frames 26 on which is mounted a vertically swingable ground engaging dolly wheel 27 for supporting the end of its arm 20.

The do-all machine so far described is shown in FIG. 1 as carrying the discing and planting attachment shown in FIGS. 2 and 3. The discing attachment shown in FIGS. 1, 2, and 3 comprises opposite hand sections each of which has a long shaft 28 that is journalled in bearings respective ones of which are mounted on respective ones of a plurality of spaced apart frames 29 which are affixed by quick attach clamps 30 to a respective one of the arm 20. A plurality of tilling discs 31 are shown mounted in spaced apart relationship along the shaft 28.

The discing attachment above described is driven by the power take off of the do-all machine shown in FIGS. 1 and 7. The power take off comprises a telescoping power shaft 32 driven from the engine 13 and which extends from the front of the machine. A power shaft differential 33 is positioned on the front of the shaft 32 to drive a telescopic power shaft 34 for in turn driving a power outlet 35 that transfers rotational movement to the shafts 28 of the interchangeable units to be carried on the arms 20. The power take off will later be described in further detail. A removable seed container 36 is shown on the frame 11 and a seed tube 37 extends therefrom to supply the planting attachments about to be described. The dotted lines show the carrier arms swung backwards into their traveling positions.

The planting attachment 38 illustrated in FIGS. 2 and 3 is intended to be used with the discing attachment above described, and includes a planting unit frame 49 for each disc 31. The planting unit frames are fastened to the quick attach clamps of the tillage mechanism which in turn are removably attachable to arms 20. Each planting unit frame 49 includes a seed chamber 39 which is located below a horizontal seed conveyor tube 40 that is positioned behind the carrier arm 20, and which contains a seed auger 41 therein to convey seeds along the tube 40 to the vertical distribution pipes 42 that connect to the chambers 39. The vertical distribution pipes 42 drop the seeds into the hopper bins 43 that are inside the chambers 39. Each hopper bin 43 has a bottom formed by the upper surface of an endless seed belt 44 which moves around seed belt drive shaft 45. An excess seed removal brush 46 sweeps the top surface of the belt to retain all seeds except those which fill the measured cups 47 of the belt 44. The measuring cups 47 of the belt 44 empty over a seed planting tube 48 that delivers the seeds to the rear of the tilling disc 31 which it supplies with seed, so that as the ground is tilled, the seed is planted. The auger 41 can be driven by any suitable means, as for example, by the chain drive shown in FIG. 10. The belt drive shafts 45 can be driven by any suitable means, as by the chain drives shown in FIG. 11.

Figure 12:
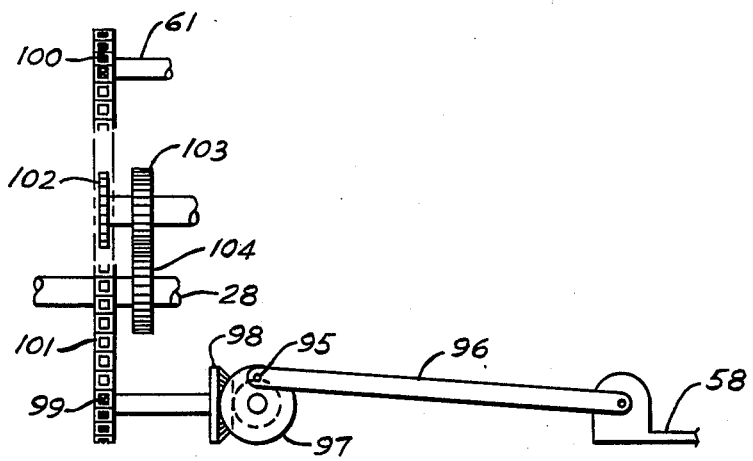
FIG. 12 is a fragmentary elevated view taken approximately on the line 12—12 of FIG. 5 and showing a drive for the sickle bar cutter.

A harvesting attachment is shown in FIG. 5. This attachment includes a plurality of harvesting unit frames 51 having quick attach clamps 30 for removable securement to the arms 20. Each frame 51 supports a hydraulic cylinder 53 that is connected to a conveyor belt and cutter bar support structure 57. The support structure 57 also carries knife 58, knife guard 59 and an endless conveyor belt 56. The support structures 57 are pivotable about longitudinal shafts 55. A harvesting unit reel 60 is shown in FIG. 6, and is mounted on shaft 61 forwardly of the cutter bar 57, as is well known. The reel includes reel arms, each having a reel paddle 62. The reel 60 and knife 58 are driven in any suitable manner, as for example, by that shown in FIG. 12.

FIG. 8 shows the underbelly conveyor 71 that is used in harvesting and which includes front conveyor 72, elevating conveyor 73, a divider 74, conveyor drives and shafts 75, and attaching eyes 76 for hydraulic cylinders to raise and lower the conveyor. The conveyor transports materials from the harvesting attachments, such as that previously described, underneath the power frame 11, as shown in FIG. 1, to tow behind vehicles.

Figure 9:
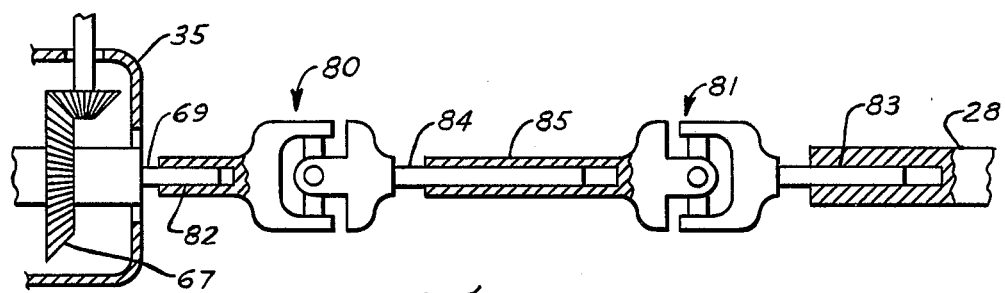
FIG. 9 is a fragmentary sectional view taken approximately on the line 9—9 of FIG. 7 for another embodiment.

As previously indicated, the power transfer unit shown in FIG. 7 is used to drive the shafts 28. In more detail, it includes telescoping drive shaft housings 64, telescoping drive shafts 65, differential housings 66, bevel gears 67, hydraulic cylinders 68, tool shaft drives 69, and power transfer housing brace 70. The oppositely extending tool drive shafts 69 are of square cross section and the ends of the shafts 28 have square holes therein so that the shafts 28 can telescope over the drive shafts 69 into a driving condition automatically when the arms 29 are swung from the parallel rearwardly extending traveling positions to the perpendicular inline working position. Alternatively, the power outlets 35 can include a pair of universal joints separated by a telescoping shaft as is used in conventional power take offs to permit the shafts 28 to be driven at various angles relative to the normal to the vehicle frame. One such mechanism is shown in FIG. 9 wherein 80 and 81 are spaced apart universal joints having a square holed driving connection 82 and a square driven connection 83 spaced apart by a telescoping square drive shaft 84 that is received in a square tubular driven section 85.

Figure 10:
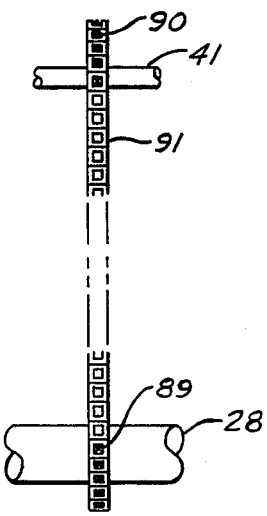
FIG. 10 is a fragmentary sectional view taken approximately on the line 10—10 of FIG. 2 and showing a drive for the shaft 28 of the implements that are attached to the arms 20.
Figure 11:
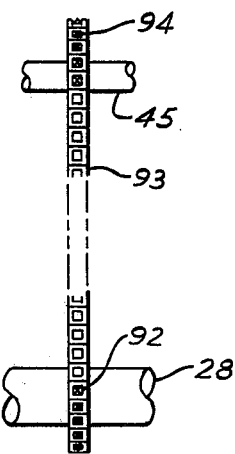
FIG. 11 is a fragmentary sectional view taken approximately on the line 11—11 of FIG. 3.

The seed auger 21 can be driven in any suitable manner, as for example, by that shown in FIG. 10. FIG. 10 shows a sprocket 89 fixed to the shaft 28, and which drives another sprocket 90 on the auger shaft 41 by means of an endless chain 91. The seed belt 44 can be driven in any suitable manner, as for example, by that shown in FIG. 11. FIG. 11 shows a sprocket 92 on the shaft 28 driving a chain 93 which in turn drives a sprocket 94 on the longitudinal seed belt drive shaft 45. The sickle bar knife 58 and reel 60 can be driven in a suitable manner, as for example, by that shown in FIG. 12. The knife 58 is reciprocated by a crank 95 and connecting rod 96. The crank 95 is turned by a bevel gear 97 that is in mesh with another bevel gear 98 and which in turn is driven by a sprocket 99. A sprocket 100 is provided on the reel shaft 61 and the sprockets 99 and 100 are driven by endless chain 101. The endless chain 101 is driven by a sprocket 102 that is connected to gear 103, which in turn is driven by gear 104 on the long implement shaft 28.

Now that the structure of the machine has been described, the operation should be readily apparent to those skilled in the art. The machine is transferred to the field that is to be prepared for planting with the arms 20 swung into their rearwardly extending position, shown by the dotted lines in FIG. 1. These arms are swingable at 90° to a position normal to power unit frame 11, as shown by the solid lines in FIG. 1. After the machine is driven to the starting point in the field, the arms 20 are swung to the inline position shown by the solid lines in FIG. 1. This is accomplished by extending the hydraulic cylinders 18 that are attached to the arms 20. When the arms 20 are in the proper angular position, the power take-off 32 is actuated to start the shafts 28 rotating. While they are rotating, the carrier arm frame 17 is lowered to provide the desired penetration of the discs 31 into the ground following which the winches 22 are actuated to level the outer ends of the arms 20. The hydraulic cylinders 25 are adjusted to help maintain the arms 20 level, after which the vehicle is ready for forward motion through the field.

The do-all machine shown in the drawing is readily adaptable for minimum tillage farming. The discs 31 have two or more notches, best seen in FIG. 2, and the portions of the discs just forward of the notches, i.e., clockwise as seen in FIG. 2, are bent outwardly in alternate directions a slight amount so that the discs will make a thin shallow furrow approximately ½ inch wide and 1 or 2 inches deep across the field. The seeding attachment previously referred to drops the seed into this narrow furrow and a suitable drag behind the implement will close the furrow over the top of the seed. Because the do-all machine operates on regularly used paths, fixed row beds soon develop and the ground which is cultivated is never traversed by the heavy equipment. This ground, therefore, does not become compacted and there is no further need for tilling the ground before planting as has been conventionally practiced. It is intended that spray booms will be attached to the arm 20 to spray herbicide on the fields 4 days before the planting operation and that a premergence herbicide will be applied, either at planting with the spray booms fixed behind the drags previously referred to, or by spraying as a separate operation after the planting operation.

The planting attachments 38 are affixed to the quick attach clamps 30 of the tilling attachment as shown in the drawings. The tubular arms 20 are provided with depending torque-absorbing plates 86, and the planting unit frames 49 are moved sideways so that suitable holes in the frames 49 receive the horizontal pins 87. The planting attachments 38 can then be retained on the pins 87 by any appropriate means, as for example, by cotter pins, not shown, in holes in the horizontal pins 87. It will further be understood that the frames 29 can also be attached to the torque-absorbing plates 86 in similar fashion.

As shown in FIG. 11, the seed augers 41 are driven in synchronism with the shafts 28. Seed is delivered from the containers 36 through the tubes 37 to hoppers 88 which in turn supply the horizontal conveyor tubes 40. The seed from the conveyor tubes 40 fall through the individual vertical distribution pipes 42 to the individual hopper bins 47 where they fall upon the seed distribution and regulating belts 44. Brushes 46 remove all seed from the belt except those within the cups or depressions 47 in the belt; and since the belt is driven in synchronism with the shafts 28, a measured amount of seed is evenly distributed to the seed planting tubes 48. The seed planting tubes 48 are positioned behind the discs 31 as is customary in grain drills, so that they, the seeds, are planted at the proper depth depending upon the vertical setting of the arms 20.

After the planting operation is completed the do-all vehicle 10 is moved to implement storage racks and the arms 20 raised until the shafts 28 rest upon suitable horizontal supports. The quick attach clamps 30 are opened and the frames 29 are moved laterally off of the pins 87, so that the frames 29 come free of the carrier arms 20. Suitable pins, not shown, are removed through the square driven connections 83 in the shafts 28, and the planting attachment is hung on the rack.

When it is desired to harvest the crops, the do-all machine 10 is moved to another rack where the harvesting attachment shown in FIGS. 5 and 6 is supported. The harvesting attachment is installed in a manner similar to that described above for the planting attachment, and the machine is then moved into the field in position for the harvesting operation. The harvesting implement will vary somewhat according to the particular crop which is to be harvested, using known technology. Since most crops will require a severing and conveying operation, the harvesting implement shown in the drawings includes a sickle bar cutter and a conveyor for transferring the severed material to the underbelly conveyor 71 of the do-all machine. In order to be sure that the crops will be positively moved to the conveyor 56, a harvesting reel 60 is used to cause the severed material to lay down upon the conveyor belt 60. The operation of the sickle bar cutter knife 58, conveyor 56 and reel 60 is similar to that of conventional equipment, but the harvesting equipment differs from conventional equipment in the manner in which it is supported and attached to the arms 20. This has been discussed above several times for the other types of attachments previously described.

It is obvious that the do-all implements can be easily and quickly positioned vertically relative to the ground. This can be done automatically by hydraulic servomechanisms, similar to those used on conventional equipment. All of the severed crop material is moved rearwardly under the power unit frame 11 by means of the underbelly conveyor 71 to locations behind the do-all machine vehicle wherein they are conveyed upwardly into tow-behind wagons.

Using the no-tillage arrangement made possible by the present invention it is visualized that fertilizer will be spread in the winter time when the ground is frozen by conveyor belts supported from the arms 20 and that no cultivation will be required between planting and harvesting because of the applications of the herbicides before and after planting. The natural freezing and thawing of the ground will loosen it sufficiently for the planting operation, since no compaction of the soil is ever involved; and the stubble left by the harvesting operation will provide an ideal shading for the tender seeds upon germination.

The present invention is not limited to such a no-tilling operation. By use of the extensible drive shown in FIG. 9 it is possible to operate the arms 20 in a position swung rearwardly from the inline position shown in FIG. 1. In this position the discs will perform a conventional discing operation and when such is desired, the discs are preferably rotated in the opposite direction shown in FIG. 2 so that they tend to provide a forward pulling action for the machine. Conventional drags can be attached to the booms behind the arms 20 and the hydraulic cylinders of the drags can be actuated to increase or decrease the dragging action to a point where it generally offsets the pulling action of the forwardly rotating discs 31.

Also if the machine is to be used for conventional operations, a cultivating attachment can be attached to the arms 20. The drill machine is ideally suited to a power driven rotary hole arrangement for cultivating the earth between the row crops.

It will now be apparent that the objects heretofore enumerated, as well as others, have been achieved and that there has been provided a do-all agricultural machine, the basic structure of which can be used for all agricultural tasks simply by changing the attachments which are affixed to the bottom of the permanent carrier arms 20. The carrier arms 20 are 50 feet or more in length, so that the machine will cover a 100 foot or more swath of the field during each pass. By so doing, the compaction of the ground, as is produced by conventional equipment, is considerably reduced. Where desired, the do-all machine makes it possible to cultivate wet soil, which conventional machinery would compact excessively. Under wet soil conditions, only the narrow strip of ground over which the wheels of the do-all vehicle pass would be compacted, and even this not too severely, since but a single pass is necessary. The do-all machine, therefore, makes it possible to cultivate and plant soils that are in too wet a condition for tillage by conventional tractors and implements. The same is true of harvesting and other operations.

While various changes may be made in the detailed construction, it is understood that such changes will be within the spirit and scope of the present invention as is defined by the appended claims.

I claim:

1. An all purpose farming vehicle comprising: a power unit frame, ground engaging traction units supporting said power unit frame, an engine mounted on said power unit frame, a superstructure positioned over said power unit frame and supported by said power unit frame, a carrier arm frame having opposite hand portions on opposite sides of said power unit frame, guide means operatively positioned between said power unit frame and said carrier arm frame to restrain lateral movement of said carrier arm frame while allowing said carrier arm frame to be positioned vertically with respect to said power unit frame, means attached to said superstructure for raising and lowering said carrier arm frame relative to said power unit frame, an implement carrier arm mounted on and extending laterally from one side of said carrier arm frame, and a tension member extending between said implement carrier arm and said superstructure.

2. The farming vehicle of claim 1 wherein said tension member comprises a power cable, said vehicle also including a winch for adjusting the distance between said superstructure and implement carrier arm.

3. The farming vehicle of claim 1 including: an implement drive shaft extending longitudinally of and beneath said implement carrier arm, spaced apart hanger frames along said implement drive shaft and journaling said implement drive shaft, and quick attach means supporting said spaced apart frames from said implement carrier arm, and whereby the implement drive shaft and hanger frames can be removed from said carrier arm as a unit by disconnecting said quick attach clamp means.

4. The farming vehicle of claim 3 wherein said carrier arm and implement drive shaft are mounted adjacent the front of said power unit frame, said vehicle further comprising: a horizontal implement drive carried by said power unit frame, coupling means for rotatably driving said implement drive shaft mounted on said carrier arm from said implement drive carried by said power unit frame, right angle gearing means for driving said implement drive carried by said power unit frame, and a generally vertically extending telescopic drive shaft rotatably driving said right angle gearing means, and whereby said implement drive shaft can be rotatably driven over an appreciable variation in height settings of said carrier arm relative to said power unit frame.

5. The farming vehicle of claim 4 including hinge means supporting said implement carrier arm from said carrier arm frame for movement between laterally extending and rearwardly extending traveling positions, said coupling means having telescopic abutment means which telescope into driving engagement when said implement carrier arm is swung into said laterally extending position from said rearwardly extending position.

6. The farming vehicle of claim 5 including a cab on the front end of said power unit frame and wherein said hinge means supports said implement carrier arm generally opposite from said cab and forwardly of said ground engaging traction units.

7. The farming vehicle of claim 2 wherein said winch is mounted above said cab.

8. An all purpose farm vehicle comprising: a vehicle frame, ground engaging drive mechanism supporting said frame with clearance from the ground, a carrier arm frame extending around opposite sides of said vehicle frame, guide means operatively positioned between said vehicle frame and said carrier arm frame to restrain lateral movement of said carrier arm frame while allowing said carrier arm frame to be positioned vertically with respect to said vehicle frame, a pair of opposite hand implement support booms, hinge means supporting said implement support booms from said carrier arm frame for movement between inline and generally parallel positions, support means fixing a power shaft to said booms, and a power take-off on said vehicle frame for driving said power shaft.

9. The all purpose farm vehicle of claim 8 wherein said shaft is positioned on a separable implement structure generally beneath said support booms, said implement further including fasteners for coupling to said booms.

\* \* \* \* \*